US012756120B2

(12) United States Patent
Champion et al.

(10) Patent No.: US 12,756,120 B2
(45) Date of Patent: *Oct. 6, 2026

(54) CABLE ASSEMBLY FOR A CABLE CONNECTOR MODULE

(71) Applicant: TE Connectivity Solutions GmbH, Schaffhausen (CH)

(72) Inventors: Bruce Allen Champion, Camp Hill, PA (US); John Joseph Consoli, Harrisburg, PA (US); Chad William Morgan, Carneys Point, NJ (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 909 days.

This patent is subject to a terminal disclaimer.

(21) Appl. No.: 17/879,071

(22) Filed: Aug. 2, 2022

(65) Prior Publication Data

US 2024/0047907 A1 Feb. 8, 2024

(51) Int. Cl.
*H01R 12/71* (2011.01)
*H01R 9/05* (2006.01)
(Continued)

(52) U.S. Cl.
CPC ......... *H01R 12/716* (2013.01); *H01R 9/0515* (2013.01); *H01R 13/516* (2013.01); *H01R 13/6592* (2013.01)

(58) Field of Classification Search
CPC .. H01R 12/716; H01R 9/0515; H01R 13/516; H01R 13/6592; H01R 12/585; H01R 12/7047; H01R 12/53; H01R 13/65914; H01R 12/75; H01R 13/025; H01R 13/648; H01B 7/17
See application file for complete search history.

(56) References Cited

U.S. PATENT DOCUMENTS 5,176,538 A 1/1993 Hansel, III
5,316,491 A 5/1994 Satou et al.
(Continued)

FOREIGN PATENT DOCUMENTS

CN 101785155 A 7/2010
CN 103178408 A 6/2013
(Continued)

OTHER PUBLICATIONS

Office Action for corresponding CN Application No. 202310952145 dated Jul. 31, 2026 (8 pages).

*Primary Examiner* — Travis S Chambers

(57) ABSTRACT

A cable assembly includes a cable having signal conductors and a cable shield surrounding an insulator. The cable assembly includes a ground clip coupled to the end of the cable having a support wall supporting the end of the cable. Exposed portions of the signal conductors extend through a window in the support wall. The ground clip includes connecting tines extending from the support wall to interface with upper and lower portions of the cable shield. The ground clip includes a mounting tab configured to be mounted to a circuit card to fix the ground clip relative to the circuit card and electrically connect the ground clip to the circuit card. The ground clip supports the cable such that the cable extends from the support wall in a cable exit direction angled transverse relative to a mounting surface of the circuit card.

33 Claims, 7 Drawing Sheets

(51) Int. Cl.
*H01R 13/516* (2006.01)
*H01R 13/6592* (2011.01)

(56) References Cited

U.S. PATENT DOCUMENTS

| | | | |
|---|---|---|---|
| 5,522,731 | A | 6/1996 | Clark |
| 6,217,372 | B1 | 4/2001 | Reed |
| 6,238,246 | B1 | 5/2001 | Ferrill et al. |
| 6,582,252 | B1 | 6/2003 | Lin |
| 6,926,551 | B1 | 8/2005 | Schulz |
| 6,986,679 | B1 | 1/2006 | Aronson |
| 8,002,572 | B2 | 8/2011 | Lu et al. |
| 8,840,432 | B2 | 9/2014 | Alden, III et al. |
| 8,845,365 | B2 | 9/2014 | Schroll et al. |
| 9,124,009 | B2 | 9/2015 | Atkinson et al. |
| 9,166,320 | B1 | 10/2015 | Herring et al. |
| 9,203,193 | B2 | 12/2015 | Hackman et al. |
| 9,437,949 | B2 | 9/2016 | Behziz et al. |
| 9,705,273 | B2 | 7/2017 | Guetig et al. |
| 9,793,692 | B1 | 10/2017 | Pogash et al. |
| 9,819,166 | B1 | 11/2017 | Capozzi |
| 9,985,367 | B2 | 5/2018 | Wanha et al. |
| 10,170,862 | B2 | 1/2019 | Weidner et al. |
| 10,411,374 | B2 | 9/2019 | Tanaka et al. |
| 10,535,956 | B2 | 1/2020 | Henry et al. |
| 10,741,941 | B2 | 8/2020 | Wu et al. |
| 11,189,943 | B2 | 11/2021 | Zerebilov et al. |
| 11,785,731 | B1 * | 10/2023 | Morgan ............... H05K 5/0026 174/545 |
| 11,924,970 | B2 | 3/2024 | Morgan et al. |
| 12,388,205 | B2 | 8/2025 | Morgan et al. |
| 12,476,398 | B2 | 11/2025 | Morgan et al. |
| 12,482,969 | B2 | 11/2025 | Morgan et al. |
| 12,489,231 | B2 | 12/2025 | Morgan |
| 2002/0057360 | A1 | 5/2002 | Abe et al. |
| 2005/0239300 | A1 | 10/2005 | Yasumura |
| 2009/0283318 | A1 | 11/2009 | Bonga et al. |
| 2011/0177719 | A1 | 7/2011 | Martin |
| 2012/0052699 | A1 * | 3/2012 | MacDougall .... H01R 13/65915 439/55 |
| 2012/0052720 | A1 | 3/2012 | David |
| 2013/0242513 | A1 | 9/2013 | Masuda et al. |
| 2013/0280955 | A1 | 10/2013 | Alden, III et al. |
| 2014/0199885 | A1 | 7/2014 | Vinther et al. |
| 2014/0321061 | A1 | 10/2014 | Moore |
| 2015/0194751 | A1 | 7/2015 | Herring |
| 2015/0303601 | A1 | 10/2015 | Jeon |
| 2015/0311612 | A1 | 10/2015 | Qiao |
| 2016/0049746 | A1 | 2/2016 | Gross |
| 2016/0093966 | A1 | 3/2016 | Behziz |
| 2016/0276759 | A1 | 9/2016 | Tran et al. |
| 2017/0164498 | A1 | 6/2017 | Song et al. |
| 2017/0179707 | A1 | 6/2017 | Gutgold et al. |
| 2017/0194744 | A1 | 7/2017 | Guetig |
| 2018/0013240 | A1 | 1/2018 | Takeuchi |
| 2018/0042148 | A1 | 2/2018 | Sasaki et al. |
| 2018/0120906 | A1 | 5/2018 | Reed et al. |
| 2018/0309215 | A1 | 10/2018 | Harmon, III et al. |
| 2018/0366852 | A1 | 12/2018 | Yang |
| 2019/0027870 | A1 | 1/2019 | Lloyd |
| 2019/0044258 | A1 | 2/2019 | Everest et al. |
| 2019/0288457 | A1 | 9/2019 | Champion |
| 2020/0015385 | A1 | 1/2020 | Bucher |
| 2020/0036117 | A1 | 1/2020 | Little et al. |
| 2020/0153135 | A1 | 5/2020 | Rossman |
| 2020/0262368 | A1 | 8/2020 | Lunde |
| 2020/0301084 | A1 | 9/2020 | Champion et al. |
| 2021/0091496 | A1 | 3/2021 | Cartier, Jr. et al. |
| 2021/0234291 | A1 | 7/2021 | Zerebilov |
| 2021/0274673 | A1 | 9/2021 | Blackburn |
| 2021/0305740 | A1 | 9/2021 | Mongold |
| 2021/0307204 | A1 | 9/2021 | Lu |
| 2021/0376507 | A1 | 12/2021 | Guo |
| 2021/0408731 | A1 | 12/2021 | Li et al. |
| 2022/0022785 | A1 | 1/2022 | Funderburk |
| 2022/0102881 | A1 | 3/2022 | Lloyd et al. |
| 2022/0151095 | A1 | 5/2022 | Blackburn et al. |
| 2022/0200210 | A1 | 6/2022 | Balakrishnan |
| 2022/0239042 | A1 | 7/2022 | Cheng |
| 2022/0320775 | A1 | 10/2022 | Kato |
| 2022/0329014 | A1 | 10/2022 | Kiuchi et al. |
| 2022/0368041 | A1 | 11/2022 | Kiuchi et al. |
| 2022/0376441 | A1 | 11/2022 | He et al. |
| 2023/0299538 | A1 | 9/2023 | Mizumura |
| 2024/0039188 | A1 | 2/2024 | Briant |
| 2024/0047907 | A1 | 2/2024 | Champion et al. |
| 2024/0047908 | A1 | 2/2024 | Morgan |
| 2024/0047909 | A1 * | 2/2024 | Morgan ............. H01R 13/6594 |
| 2024/0047910 | A1 | 2/2024 | Morgan |
| 2024/0047911 | A1 | 2/2024 | Morgan |
| 2024/0049394 | A1 | 2/2024 | Morgan |
| 2024/0063585 | A1 | 2/2024 | Shah et al. |
| 2024/0313478 | A1 | 9/2024 | Diaz |

FOREIGN PATENT DOCUMENTS

| | | | |
|---|---|---|---|
| CN | 104025393 | A | 9/2014 |
| CN | 105811178 | A | 7/2016 |
| CN | 107017505 | A | 8/2017 |
| CN | 108140922 | A | 6/2018 |
| CN | 209786205 | U | 12/2019 |
| CN | 111952806 | A | 11/2020 |
| CN | 113725642 | A | 11/2021 |
| CN | 112117604 | B | 5/2022 |
| CN | 105226410 | A | 1/2026 |
| JP | 2015207350 | A | 11/2015 |

* cited by examiner

CABLE ASSEMBLY FOR A CABLE CONNECTOR MODULE

BACKGROUND OF THE INVENTION

The subject matter herein relates generally to communication systems.

There is an ongoing trend toward smaller, lighter, and higher performance communication components and higher density systems, such as for ethernet switches or other system components. Typically, the system includes an electronic package coupled to a circuit board, such as through a socket connector. Electrical signals are routed between the electronic package and the circuit board. The electrical signals are then routed along traces on the circuit board to another component, such as a transceiver connector. The long electrical paths through the host circuit board reduce electrical performance of the system. Additionally, losses are experienced between the connector interfaces and along the electrical signal paths of the transceivers. Conventional systems are struggling with meeting signal and power output from the electronic package. Some known systems utilize an electronic assembly having cable assemblies to transmit the signals along cables rather than signal traces along the host circuit board. However, the electronic assembly includes numerous cables terminated to a circuit card. There is a need to increase the density of the cables and the contact pads on the circuit card to reduce the overall size of the electronic assembly. However, there are limits to spacing of the contact pads to allow routing of the cables from the circuit card with conventional cable termination techniques. For example, ample spacing is needed between rows of the circuit cards to allow routing of the cables along the circuit card.

BRIEF DESCRIPTION OF THE INVENTION

In one embodiment, a cable assembly is provided and includes a cable having an insulator at a cable core holding a first signal conductor and a second signal conductor. The cable has a cable shield surrounding the insulator. The first and second signal conductors have exposed portions extending forward of an end of the insulator at an end of the cable. The cable includes a ground clip coupled to the end of the cable. The ground clip includes a support wall supporting the end of the cable. The support wall includes a window. The exposed portions of the first and second signal conductors extend through the window. The ground clip includes an upper connecting tine extending from the support wall to interface with an upper portion of the cable shield and electrically connect the ground clip to the cable shield at a first point of contact. The ground clip includes a lower connecting tine extend from the support wall to interface with a lower portion of the cable shield and electrically connect the ground clip to the cable shield at a second point of contact. The ground clip includes a mounting tab extending from the support wall. The mounting tab configured to be mounted to a circuit card to fix the ground clip relative to the circuit card and electrically connect the ground clip to the circuit card. The ground clip supports the cable such that the cable extends from the support wall in a cable exit direction angled transverse relative to a mounting surface of the circuit card.

In another embodiment, a cable assembly is provided and includes a cable having an insulator at a cable core holding a first signal conductor and a second signal conductor. The cable has a cable shield surrounding the insulator. The first and second signal conductors have exposed portions extending forward of an end of the insulator at an end of the cable configured to be soldered to contact pads on a mounting surface of a circuit card. The cable assembly includes a conductor support located forward of the end of the insulator to support the exposed portions of the first and second signal conductors. The conductor support is manufactured from a dielectric material. The conductor support includes conductor channels receiving the exposed portions of the first and second signal conductors. The cable assembly includes a ground clip coupled to the end of the cable. The ground clip includes a support wall receiving the conductor support. The support wall has a lower panel and a support panel extending from the lower panel at a transverse angle. The lower panel configured to be mounted to the circuit card. The support panel extends from the circuit card at the transverse angle. The support panel supports the conductor support and the end of the cable relative to the circuit card. The support panel includes a window. The exposed portions of the first and second signal conductors extend through the window. The ground clip includes a mounting tab extending from the lower panel to secure the lower panel to the circuit card and electrically connect the ground clip to the circuit card. The ground clip includes a connecting tine extend from the support wall to interface with the cable shield and electrically connect the ground clip to the cable shield. The ground clip supports the cable such that the cable extends from the support wall in a cable exit direction angled transverse relative to the mounting surface of the circuit card.

In a further embodiment, a cable connector module is provided and includes a housing having a cavity. The cable connector module includes a circuit card received in the cavity. The circuit card has a mounting surface. The circuit card includes signal contact pads on the mounting surface. The signal contact pads are arranged in pairs. The circuit card includes a plurality of rows of the signal contact pads. The cable connector module includes cable assemblies terminated to the mounting surface of the circuit card. Each cable assembly includes a cable and a ground clip coupled to an end of the cable. The ground clip couples the cable to the mounting surface of the circuit card. The cable has an insulator at a cable core holding a first signal conductor and a second signal conductor. The cable has a cable shield surrounding the insulator. The first and second signal conductors have exposed portions extending forward of an end of the insulator at an end of the cable soldered to corresponding signal contact pads. The ground clip includes a support wall supporting the end of the cable. The support wall includes a window. The exposed portions of the first and second signal conductors extend through the window for termination to the corresponding signal contact pads. The ground clip includes an upper connecting tine extend from the support wall to interface with an upper portion of the cable shield and electrically connect the ground clip to the cable shield at a first point of contact. The ground clip includes a lower connecting tine extending from the support wall to interface with a lower portion of the cable shield and electrically connect the ground clip to the cable shield at a second point of contact. The ground clip includes a mounting tab extending from the support wall. The mounting tab mounted to the circuit card to fix the ground clip relative to the circuit card and electrically connect the ground clip to the circuit card. The ground clip supports the cable such that the cable extends from the support wall in a cable exit direction angled transverse relative to the mounting surface of the circuit card.

DETAILED DESCRIPTION OF THE INVENTION

Figure 1:
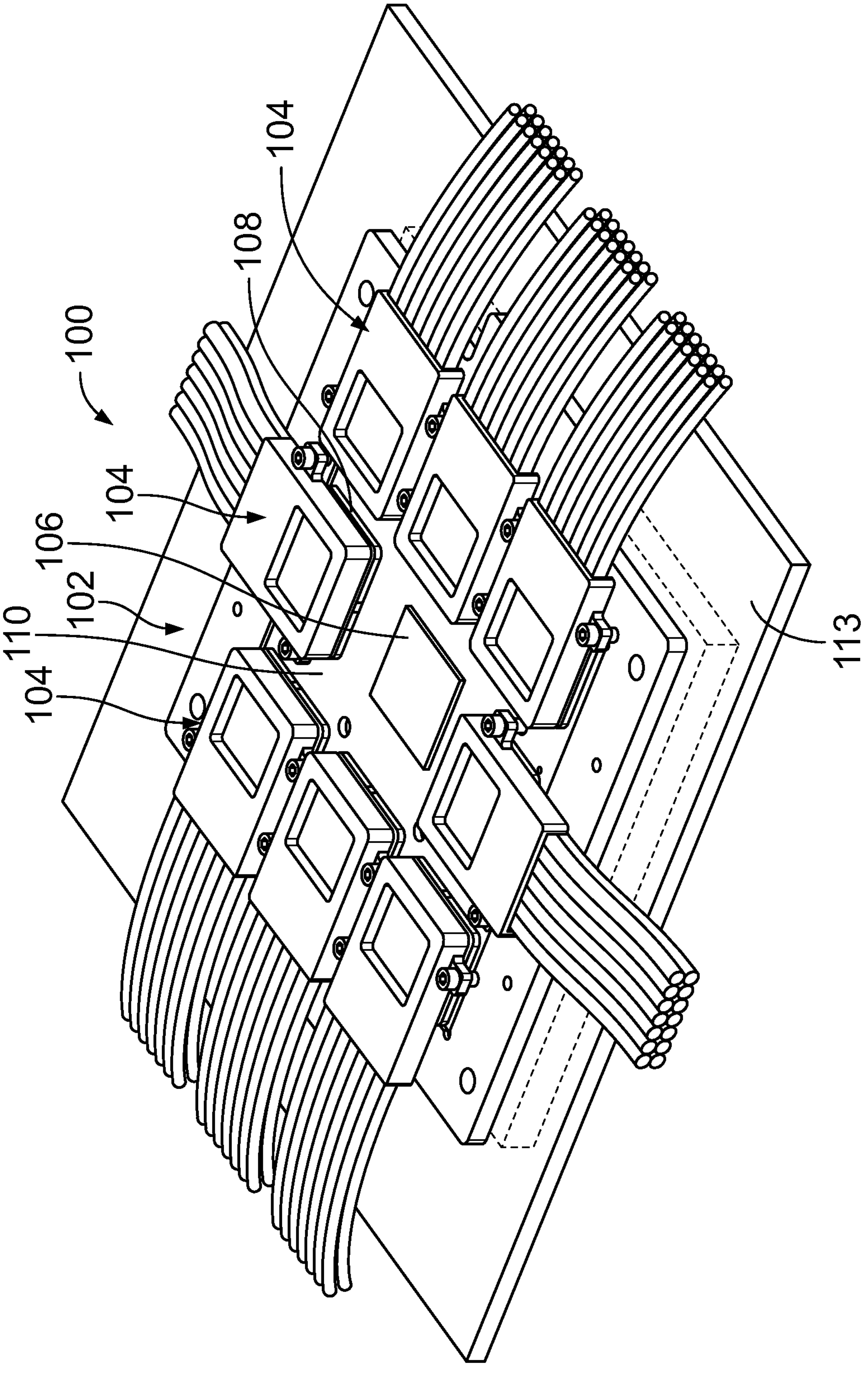
FIG. 1 is a top view of a communication system having an electronic assembly in accordance with an exemplary embodiment.

FIG. 1 is a top view of a communication system 100 having an electronic assembly 102 in accordance with an exemplary embodiment. The electronic assembly 102 includes one or more cable connector modules 104 electrically connected to a circuit board 110 by interposer assemblies 108. An electronic package 106 is electrically connected to the circuit board 110. The cable connector modules 104 are electrically connected to the electronic package 106 through the circuit board 110. In various embodiments, the cable connector modules 104 are electrical modules using electrical conductors to transmit electrical data signals.

In an exemplary embodiment, compression elements are used to load the cable connector modules 104 against the interposer assemblies 108 to electrically connect the cable connector modules 104 to the interposer assemblies 108 and to electrically connect the interposer assemblies 108 to the circuit board 110. For example, the compression elements may include springs that press the components downward to load the interposer assemblies 108 and create mechanical and electrical connections between the cable connector modules 104 and the interposer assemblies 108. In an exemplary embodiment, the communication system 100 includes heat dissipating elements (not shown) to dissipate heat from the electronic package 106 and/or the cable connector modules 104.

In various embodiments, the electronic package 106 may be an integrated circuit assembly, such as an ASIC. However, the electronic package 106 may be another type of communication component. The electronic package 106 may be mounted to the circuit board 110. For example, the circuit board 110 may be a package substrate mounted to a host circuit board 113 separate from the package substrate. In other various embodiments, the system is provided without the host circuit board 113. Rather, the circuit board 110 may be a host circuit board and the electronic package may be mounted directly thereto. Optionally, the cable connector modules 104 may be provided on multiple sides of the circuit board 110. In the illustrated embodiment, the cable connector modules 104 are provided on multiple sides of the electronic package 106, such as on all four sides of the electronic package 106. Other arrangements are possible in alternative embodiments. In various embodiments, the cable connector modules 104 are individually clamped or compressed against the interposer assemblies 108 and are thus individually serviceable and removable from the circuit board 110.

Figure 2:
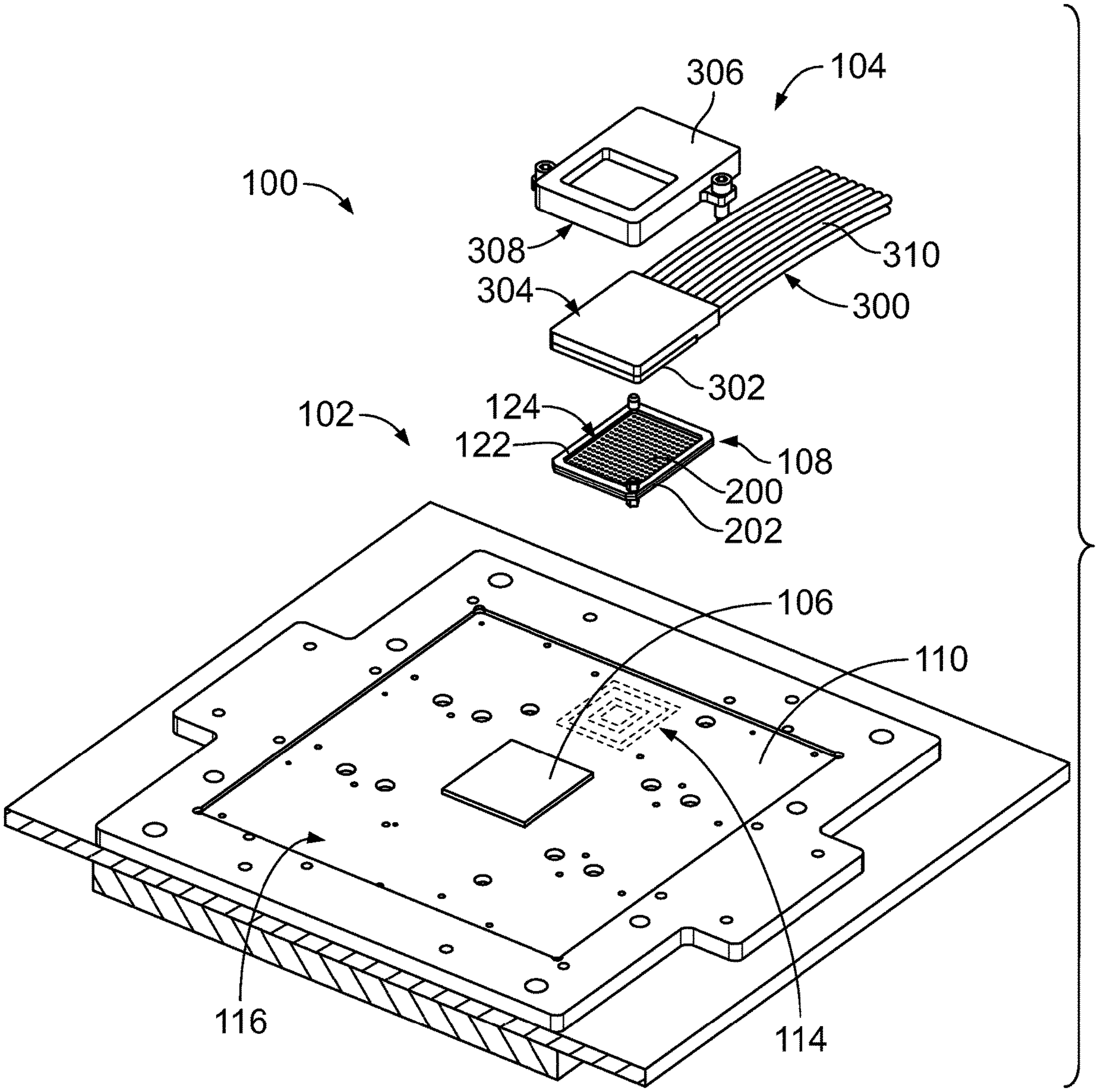
FIG. 2 is an exploded view of the communication system in accordance with an exemplary embodiment showing the electronic assembly and the circuit board.

FIG. 2 is an exploded view of the communication system 100 in accordance with an exemplary embodiment showing the electronic assembly 102 and the circuit board 110. The electronic assembly 102 includes the cable connector module 104 and the interposer assembly 108. The interposer assembly 108 is used to electrically connect the cable connector module 104 to the circuit board 110. In the illustrated embodiment, the cable connector module 104 is an electrical module having a plurality of cables terminated within the cable connector module 104.

The circuit board 110 includes a mounting area 114 on an upper surface 116 of the circuit board 110. The mounting area 114 may be located adjacent the electronic package 106 (shown in FIG. 1). The circuit board 110 includes board contacts (not shown) at the mounting area 114. The board contacts are arranged in an array, such as in rows and columns. The board contacts may be pads or traces of the circuit board 110. The board contacts may be high speed signal contacts, sideband signal contacts, ground contacts, or power contacts. The interposer assembly 108 is coupled to the circuit board 110 at the mounting area 114.

In an exemplary embodiment, the electronic assembly 102 includes a socket 122 having a cavity 124 that receives the interposer assembly 108. The cable connector module 104 is configured to be plugged into the cavity 124 of the socket 122 to mate with the interposer assembly 108. The socket 122 guides mating of the cable connector module 104 with the interposer assembly 108. The socket 122 may include securing features to secure the cable connector module 104 in the socket 122.

The interposer assembly 108 includes an array of interposer contacts 200 held together by a support plate 202. The support plate 202 is manufactured from an insulative material, such as a polyimide material, to electrically isolate the interposer contacts 200 from one another. In an exemplary embodiment, the interposer contacts 200 are compressible contacts, such as conductive polymer columns. Other types of interposer contacts 200 may be utilized in alternative embodiments. Each interposer contact 200 includes an upper mating interface and a lower mating interface.

The interposer assembly 108 is positioned in the cavity 124 of the socket 122. The socket 122 includes walls at least partially surrounding the cavity 124. In the illustrated embodiment, the cable connector module 104 is plugged into the socket 122 from above. The cable connector module 104 is configured to be mated with the interposer contacts 200 of the interposer assembly 108.

The cable connector module 104 includes a plurality of cable assemblies 300 terminated to a circuit card 302, such as being soldered to the circuit card 302. Each cable assembly 300 includes a cable 310 and a support structure for the cable 310. The support structure is used to couple an end of the cable 310 to the circuit card 302. In an exemplary embodiment, the cable connector module 104 includes a cable holder 304 that holds the cable assemblies 300 relative to the circuit card 302. The cable connector module 104 includes a connector housing 306 having a cavity 308 that holds the cable assemblies 300 and the circuit card 302. The cable connector module 104 may include a heat transfer element (not shown) thermally coupled to the cable assembly 300, such as to dissipate heat from components on the circuit card 302. The connector housing 306 is configured to be coupled to the socket 122 and/or the circuit board 110 using mounting hardware. The connector housing 306 holds the circuit card 302 for mating with the interposer assembly 108. The connector housing 306 may be a metal shell or cage that receives the cable assembly 300.

The cable holder 304 is coupled to the cables 310 and holds the cables 310 relative to each other. The cable holder 304 may be coupled to the circuit card 302 to hold the cables 310 relative to the circuit card 302. The cable holder 304 provides strain relief for the cables 310. In alternative embodiments, the cable assembly 300 may be provided without the cable holder 304. Rather, the cables 310 may be unsupported or freely arranged in the connector housing 306. The circuit card 302 is coupled to the connector housing 306 to position the mating interface of the circuit card 302 for mating with the interposer assembly 108. The cable holder 304 is coupled to the connector housing 306 to position the cables 310 relative to the connector housing 306. The connector housing 306 is configured to be coupled to the socket 122, such as to the walls of the socket 122, to position the cable connector module 104 in the cavity 124. The socket 122 positions the connector housing 306, and thus the circuit card 302, in the cavity 124 for mating with the interposer assembly 108.

Figure 3:
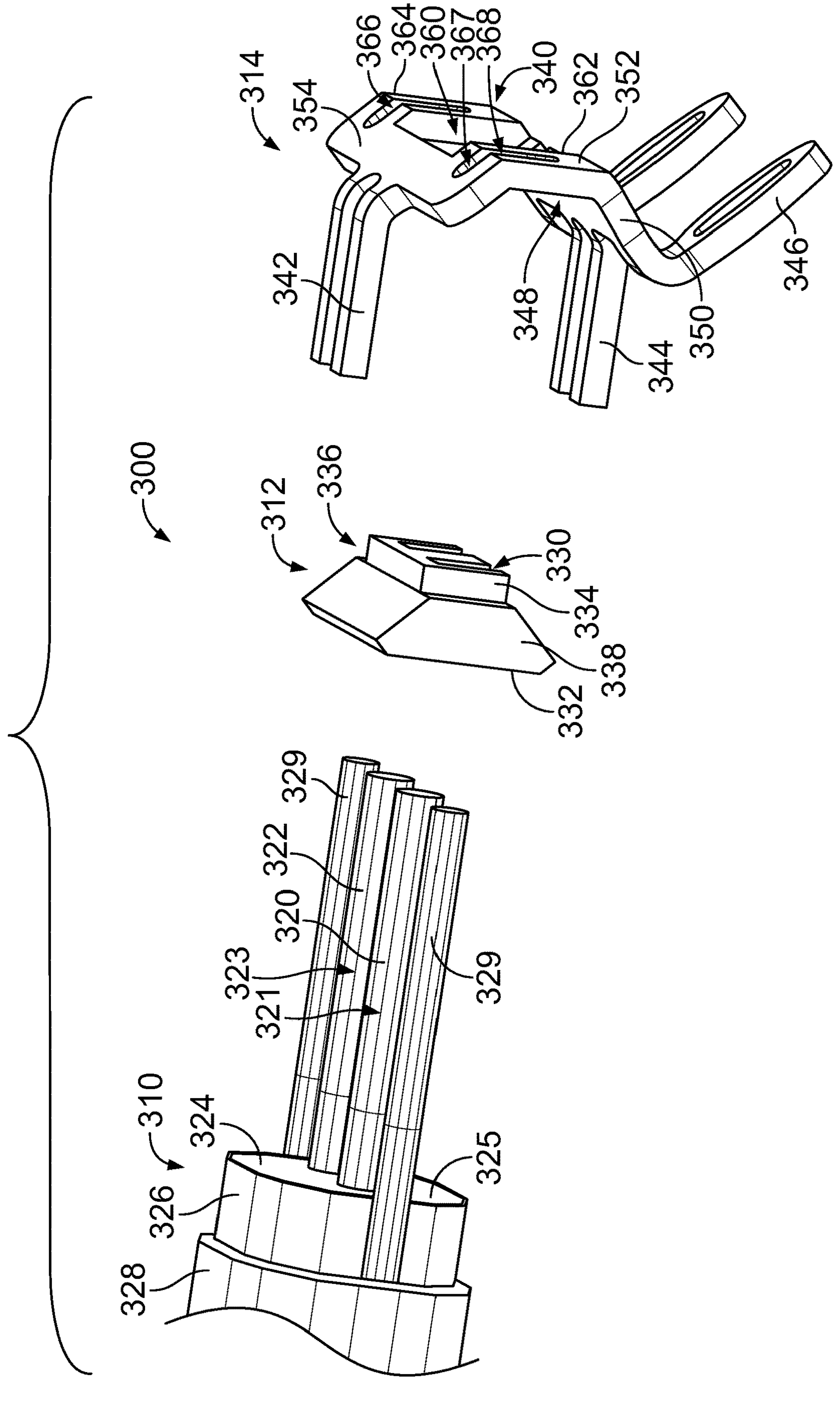
FIG. 3 is an exploded view of the cable assembly in accordance with an exemplary embodiment.

FIG. 3 is an exploded view of the cable assembly 300 in accordance with an exemplary embodiment. In an exemplary embodiment, the cable assembly 300 includes the cable 310, a conductor support 312 coupled to the end of the cable 310, and a ground clip 314 coupled to the end of the cable 310.

The ground clip 314 is used to mechanically and electrically connect the cable 310 to the circuit card 302. In an exemplary embodiment, the ground clip 314 is used to direct the cable 310 away from the circuit card 302, such as at a predetermined cable exit angle. For example, the ground clip 314 may hold the cable 310 at a cable exit angle that is non-parallel to the circuit card 302 and non-perpendicular to the circuit card 302. In various embodiments, the ground clip 314 may hold the cable 310 at a cable exit angle of between 30° and 60°. Optionally, the ground clip 314 may hold the cable 310 at a cable exit angle of approximately 45°. The ground clip 314 holds the cable 310 at an angle to allow tight spacing of the cable assemblies 300. For example, the contact pads on the circuit card 302 may be more densely populated (for example, closer spacing) by forcing the cable 310 to exit at an angle from the circuit card 302 as compared to conventional cable connector modules having the cables oriented generally parallel to the circuit card for termination to the circuit card. In an exemplary embodiment, the ground clip 314 is used to electrically connect to the cable 310, such as to improve electrical performance of the cable connector module 104. For example, the ground clip 314 may reduce excess insertion loss and cross talk due to tighter control of electromagnetic fields at the termination area. The ground clip 314 positions the cable 310 to have a short ground return path between the cable 310 and the circuit card 302 for improved electrical characteristics.

Each cable 310 includes at least one signal conductor and a shield structure providing electrical shielding for the at least one signal conductor. In an exemplary embodiment, the cables 310 are twin-axial cables. For example, each cable 310 includes a first signal conductor 320 and a second signal conductor 322. The signal conductors 320, 322 carry differential signals. The cable 310 includes an insulator 324 surrounding the signal conductors 320, 322 and a cable shield 326 surrounding the insulator 324. In various embodiments, the insulator 324 includes a single core surrounding both signal conductors 320, 322. In other various embodiments, the insulator 324 is a dual core insulator having a first dielectric element surrounding the first signal conductor 320 and a second dielectric element surrounding the second signal conductor 322. The cable shield 326 provides circumferential shielding around the signal conductors 320, 322. The cable 310 includes a cable jacket 328 surrounding the cable shield 326. In various embodiments, the cable 310 includes one or more drain wires 329 electrically connected to the cable shield 326. For example, the cable 310 may include a pair of drain wires 329 on opposite sides of the cable 310. The drain wire(s) 329 are configured to be terminated to the circuit card 302, such as being soldered to contact pads of the circuit card 302. In an exemplary embodiment, the drain wires 329 are configured to be electrically connected to the ground clip 314.

In an exemplary embodiment, at an end of the cable 310, the cable jacket 328, the cable shield 326, and the insulator 324 may be removed (e.g., stripped) to expose portions of the signal conductors 320, 322. Exposed portions 321, 323 of the signal conductors 320, 322 extend forward from an end 325 of the insulator 324. The exposed portions 321, 323 are configured to be mechanically and electrically coupled (e.g., soldered) to corresponding contact pads on the circuit card 302. The exposed portions 321, 323 may be bent, such as bent inward toward each other (distance between reduced for tighter coupling and smaller trace spacing) and/or may be bent to extend along the surface of the circuit card 302 to terminate to the contact pads.

The conductor support 312 includes a dielectric body used to hold the exposed portions 321, 323 of the signal conductors 320, 322. The conductor support electrically isolates the signal conductors 320, 322 from each other and from the ground clip 314. The conductor support 312 includes conductor channels 330 that receive the signal conductors 320, 322. The conductor channels 330 extend between a front and a rear of the conductor support 312. The conductor channels 330 position the signal conductors 320, 322 relative to each other. The conductor channels 330 may pass straight through the conductor support 312 between the front and the rear. However, in alternative embodiments, the conductor channels 330 may be curved or angled to change relative positions of the signal conductors 320, 322 between the front and the rear. For example, the conductor channels 330 may be closer together at the front and further apart at the rear. The conductor channels 330 may be open at the bottom of the conductor support 312 to receive the signal conductors 320, 322. Alternatively, the signal conductors 320, 322 may be fed into the conductor channels 330 through the rear of the conductor support 312.

The conductor support 312 includes a rear wall 332 at the rear of the conductor support 312. The rear wall 332 faces the end 325 of the insulator 324. The rear wall 332 may abut against the insulator 324. The conductor support 312 includes a nose cone 334 at a front portion 336 of the conductor support 312. The nose cone 334 at the front portion 336 is configured to be received in the ground clip 314. The conductor channels 330 pass through the front portion 336. In an exemplary embodiment, side walls 338 of the conductor support 312 may be angled inward from the rear wall 332 to the nose cone 334.

In various embodiments, the conductor support 312 may be coupled to the ground clip 314. The ground clip 314 positions and supports the conductor support 312 relative to the circuit card 302 to control the position and orientation of the cable 310 (for example, to control the cable exit direction). Optionally, the conductor support 312 may be preformed separate from the ground clip 314. For example, the conductor support 312 may be molded separate from the ground clip 314 and then coupled to the ground clip 314, such as being press-fit into the ground clip 314 and held by an interference fit. The conductor support 312 may be secured to the ground clip 314 using adhesive, fasteners, clips or other securing means.

The signal conductors 320, 322 may be loaded into the conductor support 312 prior to coupling to the ground clip 314. Alternatively, the signal conductors 320, 322 may be loaded into the conductor support 312 after the conductor support 312 is coupled to the ground clip 314. In various embodiments, the conductor channels 330 of the conductor support 312 are open at a side (for example, top side, or bottom side, or right side or left side) of the conductor support 312 to side load the first and second signal conductors 320, 322 into the conductor channels 330.

In alternative embodiments, the conductor support 312 may be formed in place on the ground clip 314 rather than being separately manufactured and then assembled with the ground clip 314. For example, the conductor support 312 may be overmolded over a portion of the ground clip 314. The conductor support 312 is molded to the ground clip 314 to fix the position of the conductor support 312 relative to the ground clip 314.

In various embodiments, the conductor support 312 of multiple cable assemblies 300 may be integrated as a unitary, monolithic structure. For example, the conductor supports 312 may be co-molded together, which controls spacing and relative positioning of the cables 310. In various embodiments, the conductor supports 312 may be overmolded over multiple ground clip 314 to control relative positioning of the ground clip 314 of multiple cable assemblies 300.

Figure 4:
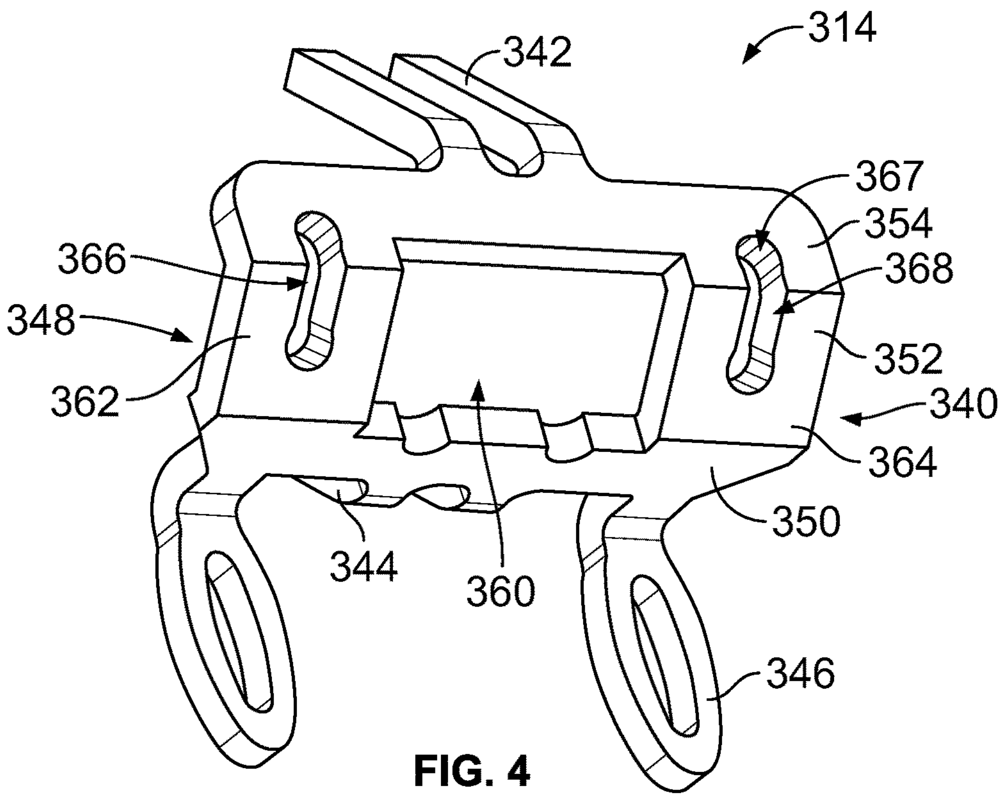
FIG. 4 is a front perspective view of the ground clip in accordance with an exemplary embodiment.
Figure 5:
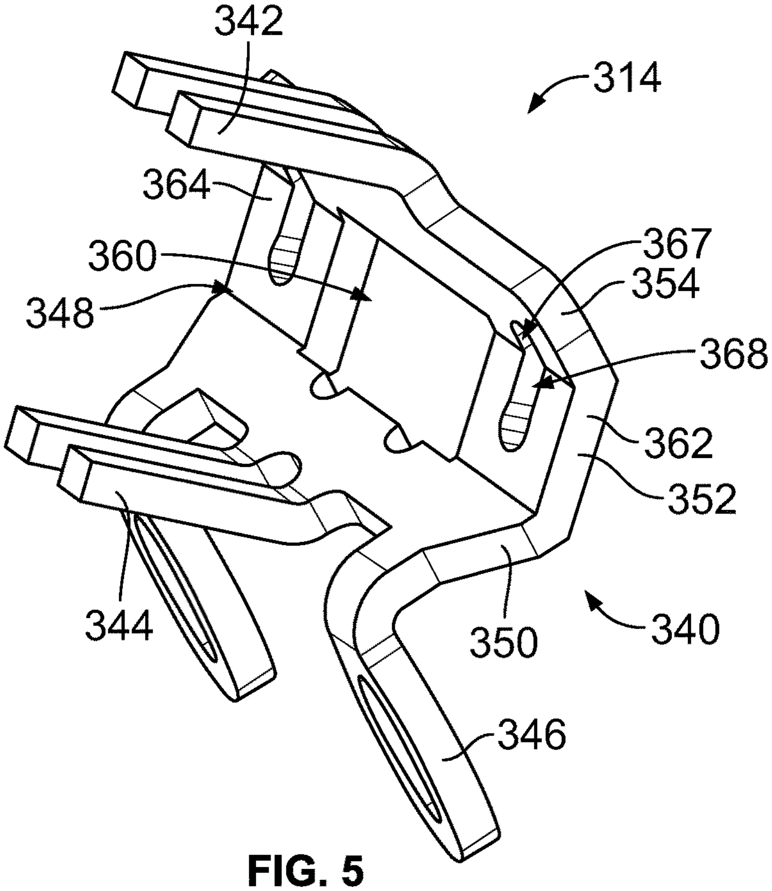
FIG. 5 is a rear perspective view of the ground clip in accordance with an exemplary embodiment.

With additional reference to FIGS. 4 and 5, which are front and rear perspective views of the ground clip 314, the ground clip 314 is used as a mechanical and electrical connector between the cable 310 and the circuit card 302. The ground clip 314 is manufactured from a conductive material, such as a metal material. In an exemplary embodiment, the ground clip 314 is stamped and formed from a metal plate into a shape configured to mechanically and electrically connect the cable 310 to the circuit card 302. The ground clip 314 is configured to be electrically connected to the cable shield 326 of the cable 310. The ground clip 314 is configured to be electrically connected to the circuit card 302.

The ground clip 314 includes a support wall 340 used to support the cable 310. The ground clip 314 includes connecting tines extending from the support wall 340, such as one or more upper connecting tines 342 and one or more lower connecting tines 344. The upper connecting tines 342 are configured to be electrically connected to an upper side of the cable shield 326. The lower connecting tines 344 are configured to be electrically connected to a lower side of the cable shield 326. The connecting tines 342, 344 provide multiple points of contact with the cable shield 326. Terminating to multiple sides of the cable shield 326 reduces excess insertion loss and crosstalk due to tighter control of the electromagnetic fields at the end of the cable. The ground clip 314 includes one or more mounting tabs 346 extending from the support wall 340. The mounting tabs 346 are used to mount the ground clip 314 to the circuit card 302. In the illustrated embodiment, the mounting tabs 346 are compliant pins, such as eye-of-the-needle pins, configured to be press fit into plated vias of the circuit card 302. In alternative embodiments, the mounting tabs 346 may be solder tabs configured to be soldered to the circuit card 302.

In an exemplary embodiment, the support wall 340 forms a pocket 348 that receives the end of the cable 310. The pocket 348 receives the conductor support 312. The support wall 340 includes various interconnected panels that form the pocket 348 to receive and support the cable 310. In an exemplary embodiment, the support wall 340 includes a lower panel 350, a support panel 352, and an upper panel 354. The lower panel 350 defines a base of the support wall 340 that is configured to be mounted to the circuit card 302. For example, the lower panel 350 is configured to rest on the upper surface of the circuit card 302. The support panel 352 extends between the lower panel 350 and the upper panel 354. The support panel 352 supports the end of the cable 310. The support panel 352 supports the conductor support 312.

In an exemplary embodiment, the lower connecting tines 344 extend from the lower panel 350, such as rearward from a rear edge of the lower panel 350. The lower connecting tines 344 may be angled transverse (for example, non-parallel) to the lower panel 350 to extend along the cable 310. In an exemplary embodiment, the mounting tabs 346 extend from the lower panel 350, such as rearward from a rear edge of the lower panel 350. In an exemplary embodiment, the upper connecting tines 342 extend from the upper panel 354, such as rearward from a rear edge of the lower panel 350. The upper connecting tines 342 may be angled transverse (for example, non-parallel) to the upper panel 354 to extend along the cable 310.

In an exemplary embodiment, the support panel 352 is angled transverse (for example, non-parallel) relative to the lower panel 350 and the upper panel 354. For example, the support panel 352 may be angled at between 30° and 60° relative to the lower panel 350, such as approximately 45°. In an exemplary embodiment, the upper panel 354 is angled transverse (for example, non-parallel) relative to the support panel 352. For example, the upper panel 354 may be angled at between 30° and 60° relative to the support panel 352, such as approximately 45°. The angles of the panels control the cable exit angle from the circuit card 302. For example, the plane defined by the support panel 352 defines the angle of the end 325 of the insulator 324 of the cable 310. The cable 310 extends from the ground clip in a cable exit direction that is perpendicular to the plane of the support panel 352.

The support panel 352 includes a window 360 therethrough. The window 360 receives the signal conductors 320, 322. The window 360 receives the nose cone 334 at the front portion 336 of the conductor support 312. Optionally, the window 360 extends between the lower panel 350 and the upper panel 354. The window 360 may extend into the lower panel 350 and/or the upper panel 354. The support panel 352 includes a left section 362 to the left side of the window 360 and a right section 364 to the right side of the window 360. In an exemplary embodiment, the support panel 352 includes one or more drain wire slots 366 that receive the drain wires 329. For example, the drain wire slots 366 may be provided in the left section 362 and/or the right section 364. The drain wire slots 366 may include ports 367 and compression sections 368. The ports 367 are wider than the compression sections 368. The ports 367 may be wider than the drain wires 329 to allow loading of the drain wires 329 into the drain wire slots 366. The drain wires 329 may be moved into the compression sections 368 to interface with the support panel 352. The drain wires 329 may be held in the compression sections 368 by an interference fit. In other various embodiments, the drain wires 329 may be soldered to the support panel 352.

Figure 6:
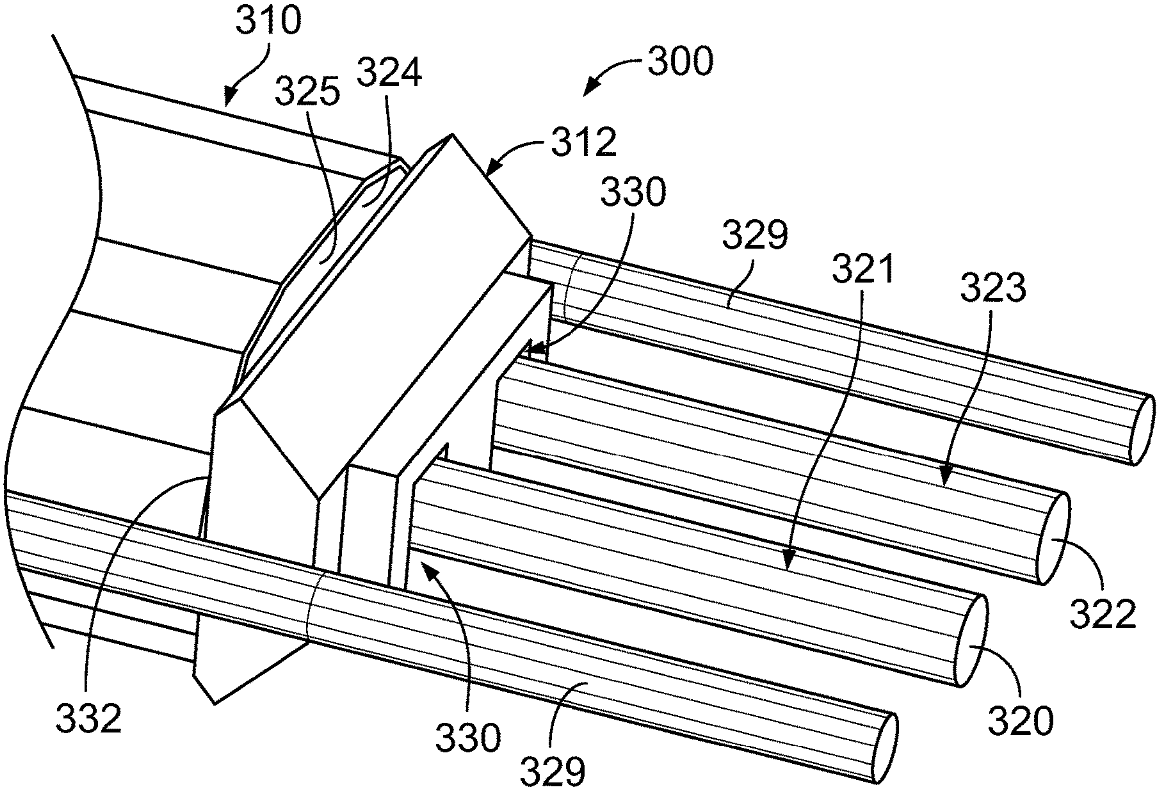
FIG. 6 shows a portion of the cable assembly illustrating the conductor support coupled to the end of the cable in accordance with an exemplary embodiment.

FIG. 6 shows a portion of the cable assembly 300 illustrating the conductor support 312 coupled to the end of the cable 310. During assembly, the conductor support 312 is coupled to the exposed portions 321, 323 of the signal conductors 320, 322. The signal conductors 320, 322 are loaded into the conductor channels 330. The rear wall 332 faces, and may abut against, the end 325 of the insulator 324. The conductor support 312 may be used to support the drain wires 329. The dielectric material of the conductor support 312 controls impedance along the signal paths. In various embodiments, the conductor support 312 is made of low loss material to decrease insertion loss along the signal paths.

Figure 7:
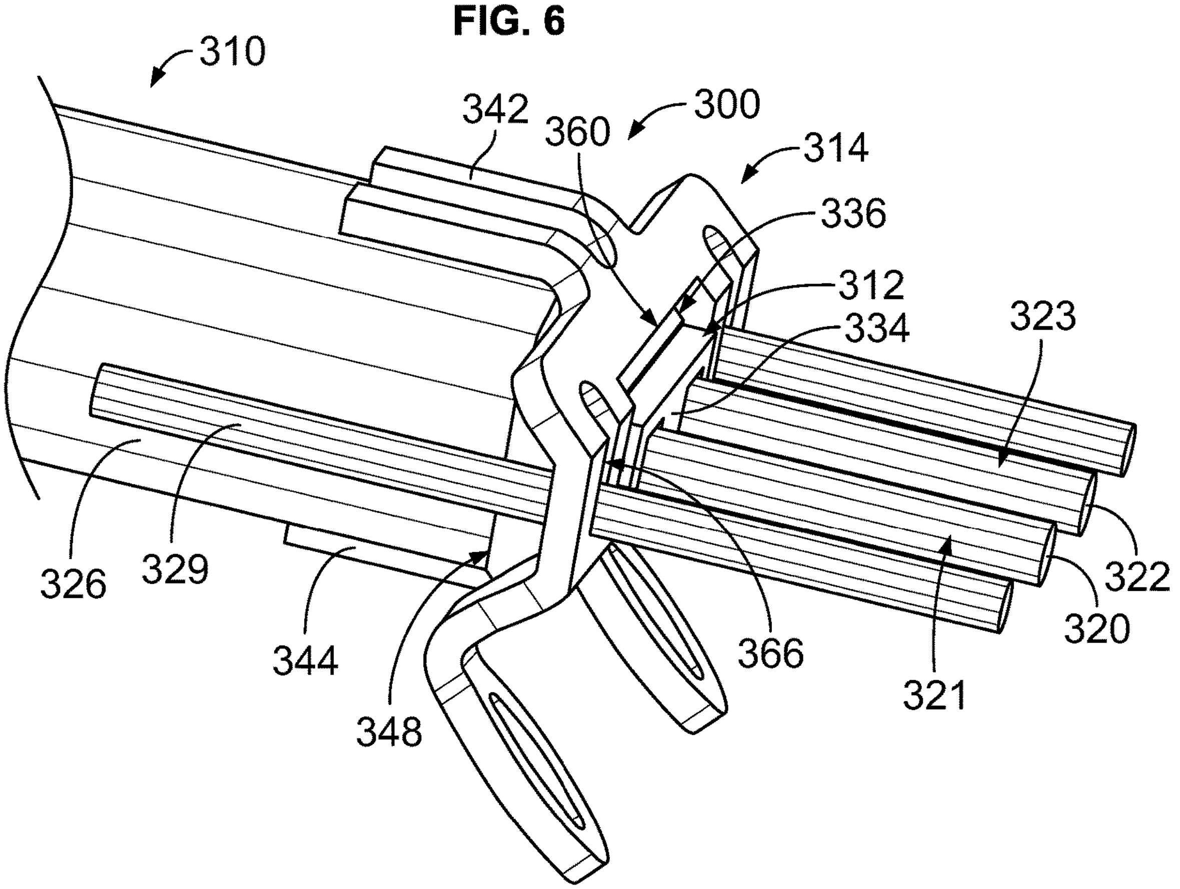
FIG. 7 shows a portion of the cable assembly illustrating the ground clip coupled to the conductor support and the end of the cable in accordance with an exemplary embodiment.

FIG. 7 shows a portion of the cable assembly 300 illustrating the ground clip 314 coupled to the conductor support 312 and the end of the cable 310. During assembly, the cable 310 and the conductor support 312 are positioned in the pocket 348. The nose cone 334 at the front portion 336 is loaded into the window 360. The dielectric material of the conductor support 312 electrically isolates the signal conductors 320, 322 from the ground clip 314. The exposed portions 321, 323 extend forward of the ground clip 314, such as for termination to the circuit card 302. The drain wires 329 pass through the drain wire slots 366 forward of the ground clip 314 for termination to the circuit card 302. The connecting tines 342, 344 are connected to the cable shield 326, such as to opposite sides (upper side and lower side) of the cable 310. The connecting tines 342, 344 define the cable exit angle from the ground clip 314.

Figure 8:
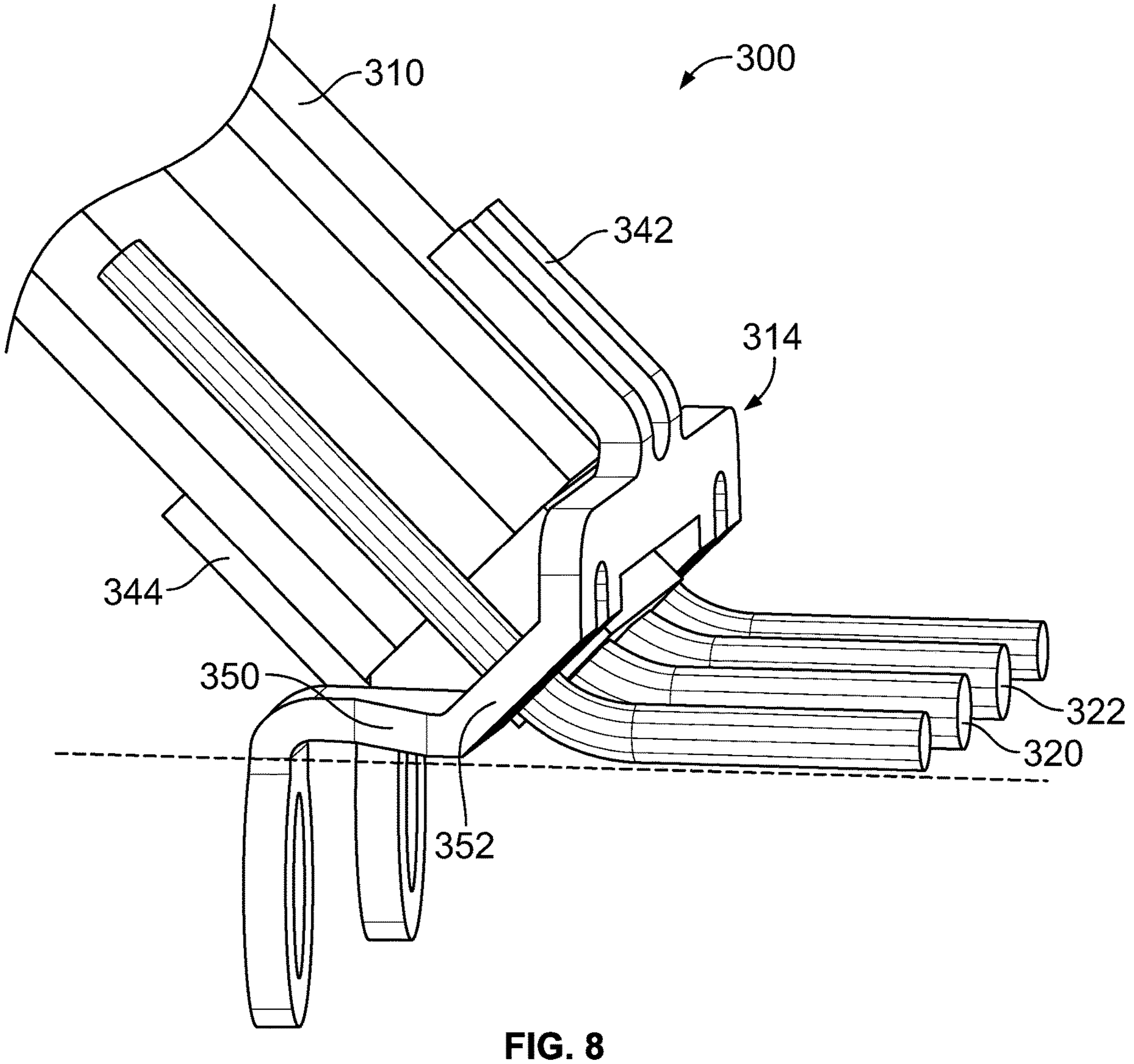
FIG. 8 shows a portion of the cable assembly illustrating the signal conductors transitioning from the ground clip and the end of the cable in accordance with an exemplary embodiment.

FIG. 8 shows a portion of the cable assembly 300 illustrating the signal conductors 320, 322 transitioning from the ground clip 314 and the end of the cable 310. The signal conductors 320, 322 are bent at an angle relative to the cable axis to transition to the circuit card 302 (not shown). The ground clip 314 defines the cable exit angle from the ground clip 314. The support panel 352 controls the cable exit angle. For example, the support panel 352 is angled transverse relative to the lower panel 350 at the base of the ground clip 314. The lower panel 350 is configured to be oriented parallel to the circuit card 302. However, the support panel 352 is angled transverse to the circuit card 302. The cable 310 extends from the ground clip along a cable axis that is oriented generally perpendicular to the support panel 352. The connecting tines 342, 344 also guide the cable 310 away from the support panel 352.

Figure 9:
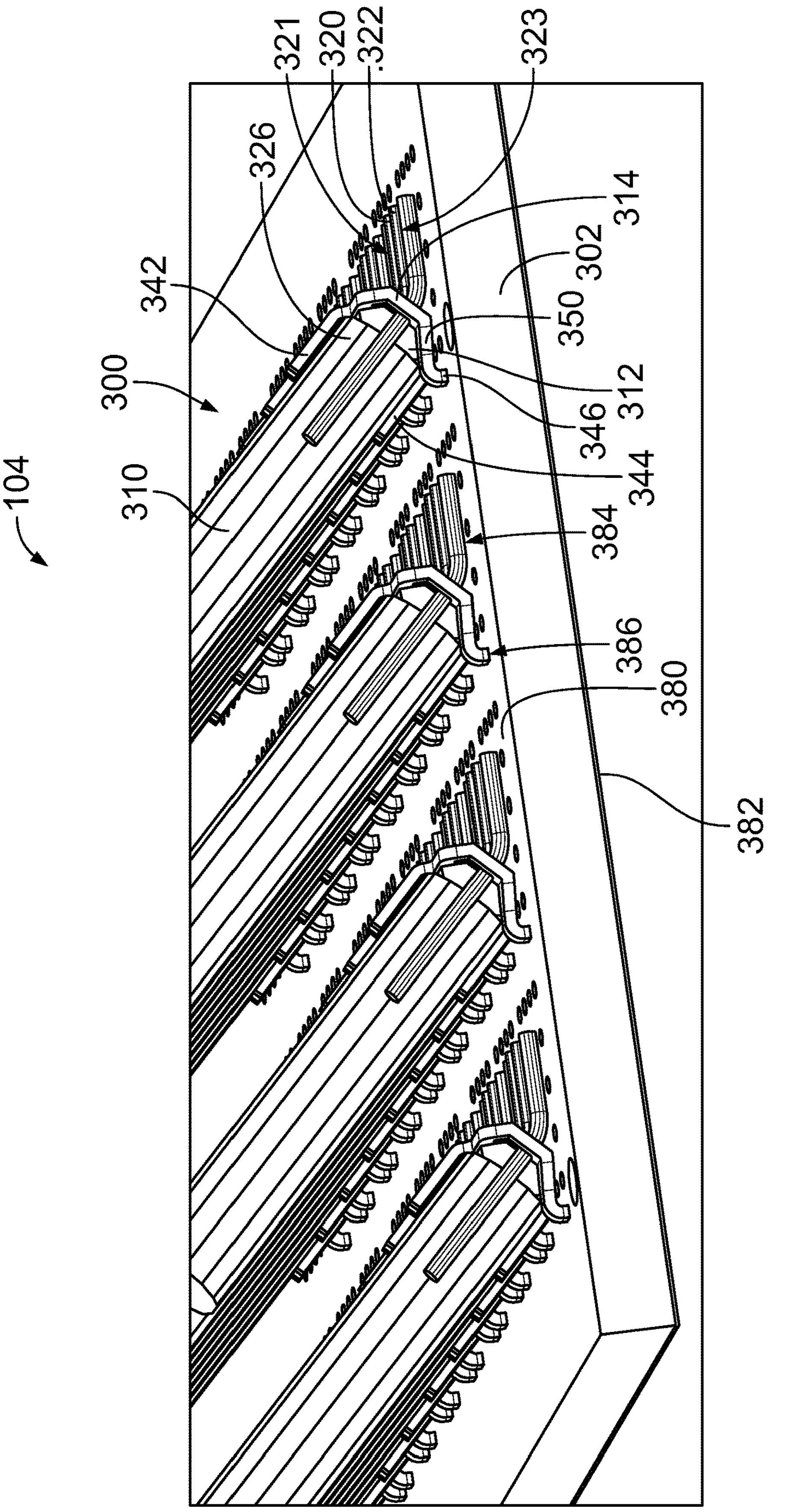
FIG. 9 is a top perspective view of a portion of the cable connector module in accordance with an exemplary embodiment showing the circuit card and a plurality of the cable assemblies terminated to the circuit card.

FIG. 9 is a top perspective view of a portion of the cable connector module 104 in accordance with an exemplary embodiment showing the circuit card 302 and a plurality of the cable assemblies 300 terminated to the circuit card 302. In the illustrated embodiment, the cable assemblies 300 are provided in multiple rows, such as three or more rows. In various embodiments, the cable connector module 104 may include at least thirty-six (36) cable assemblies 300 terminated to the circuit card 302 in an area of approximately 30 mm by 20 mm. For example, the cable assemblies 300 may be arranged in a 4×9 matrix.

The circuit card 302 includes an upper surface 380 and a lower surface 382 opposite the upper surface 380. In an exemplary embodiment, the circuit card 302 includes contact pads 384 at the upper surface 380 configured to be electrically connected to the signal conductors 320, 322 of the cables 310. The contact pads 384 may be traces or circuits of the circuit card 302. The contact pads 384 may be arranged in groups, such as pairs. In the illustrated embodiment, the contact pads 384 are all provided on the upper surface 380. However, in alternative embodiments, the contact pads 384 may additionally be provided on the lower surface 382. Optionally, the contact pads 384 may be arranged in a ground-signal-signal-ground arrangement. In the illustrated embodiment, the contact pads 384 are provided in multiple rows along the circuit card 302. The rows are aligned parallel to the front and the rear of the circuit card 302. The circuit card 302 is densely populated with the contact pads 384 to allow a large number of cables 310, and thus a large number of signal lines, to be electrically connected to the circuit card 302.

In an exemplary embodiment, the circuit card 302 includes ground vias 386 at the upper surface 380. The ground vias 386 are located proximate to the contact pads 384. The ground vias 386 are electrically connected to the ground plane. In an exemplary embodiment, the ground clip 314 is coupled to the ground vias 386. For example, the mounting tabs 346 of the ground clip 314 may be press fit into the ground vias 386.

The circuit card 302 includes mating pads (not shown) at the lower surface 382 configured to be electrically connected to corresponding interposer contacts 200 of the interposer assembly 108 (both shown in FIG. 2). The mating pads are electrically connected to corresponding contact pads 384 through traces, vias or other circuits of the circuit card 302. In an exemplary embodiment, the mating pads are all provided on the lower surface 382. However, the mating pads may be provided on both the upper surface 380 and the lower surface 382 in alternative embodiments, such as when the circuit card 302 is a pluggable card configured to be plugged into a card slot of a receptacle connector.

The ground clip 314 is used to mechanically and electrically connect the cable 310 to the circuit card 302. The mounting tabs 346 mechanically secure the ground clip 314 to the circuit card 302 holding the lower panel 350 along the upper surface 380 of the circuit card 302. In an exemplary embodiment, the ground clip 314 is used to direct the cable 310 away from the circuit card 302 at a predetermined cable exit angle. For example, the ground clip 314 may hold the cable 310 at a cable exit angle that is non-parallel to the circuit card 302 and non-perpendicular to the circuit card 302. In various embodiments, the ground clip 314 may hold the cable 310 at a cable exit angle of between 30° and 60°. Optionally, the ground clip 314 may hold the cable 310 at a cable exit angle of approximately 45°. The ground clip 314 directs the cable 310 away from the upper surface 380 at an angle to allow tight spacing of the cable assemblies 300. For example, the contact pads 384 on the circuit card 302 may be more densely populated (for example, closer spacing) by forcing the cable 310 to exit at an angle from the upper surface 380 of the circuit card 302 as compared to conventional cable connector modules having the cables oriented generally parallel to the circuit card for termination to the circuit card.

In an exemplary embodiment, the ground clip 314 is used to electrically connect to the cable 310, such as to improve electrical performance of the cable connector module 104. For example, the ground clip 314 may reduce excess insertion loss and cross talk due to tighter control of electromagnetic fields at the termination area. The ground clip 314 positions the cable 310 to have a short ground return path between the cable 310 and the circuit card 302 for improved electrical characteristics. For example, the ground return path is defined from the cable shield 326 directly into the ground clip 314 through the connecting tines 342, 344, and directly from the ground clip 314 to the circuit card 302 through the mounting tabs 346. The connecting tines 342, 344 may be soldered to the cable shield 326. The connecting tines 342, 344 provide multiple points of contact with the cable shield 326 at different sides of the cable 310 to reduce insertion loss and crosstalk by controlling electromagnetic fields around the end of the cable 310. The exposed portions 321, 323 of the signal conductors 320, 322 have a short distance from the end 325 of the insulator 324 to the contact pads 384. The conductor support 312 tightly controls the impedance in the termination area (between the end 325 of the insulator 324 and the contact pads 384). The ground clip 314 provides shielding in the termination area. For example, the ground clip 314 occupies much of the surrounding space between the end 325 of the insulator 324 and the upper surface 380 of the circuit card 302 to reduce insertion loss and crosstalk by tightly controlling the electromagnetic fields in the termination area.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable assembly comprising:

a cable having an insulator at a cable core holding a first signal conductor and a second signal conductor, the cable having a cable shield surrounding the insulator, the first and second signal conductors having exposed portions extending forward of an end of the insulator at an end of the cable; and a ground clip coupled to the end of the cable;

wherein the ground clip supports the cable such that the cable extends from the ground clip in a cable exit direction angled transverse relative to a mounting surface of the circuit card.

2. The cable assembly of claim 1, wherein the ground clip supports the cable at the cable exit direction of between 30° and 60° relative to the mounting surface of the circuit card.

3. The cable assembly of claim 1, wherein the ground clip includes a stamped and formed body.

4. The cable assembly of claim 1, wherein the first signal conductor extends along a first axis through the insulator, the exposed portion of the first signal conductor extends along a second axis, the second axis being transverse to the first axis.

5. The cable assembly of claim 1, further comprising a conductor support located forward of the end of the insulator to support the exposed portions of the first and second signal conductors, the conductor support being manufactured from a dielectric material, the conductor support including conductor channels receiving the exposed portions of the first and second signal conductors, a front portion of the conductor support extending into a window of a support wall of the ground clip.

6. The cable assembly of claim 5, wherein the conductor support includes a rear wall facing the end of the insulator, the conductor channels extending between the rear wall and the front portion to control positioning of the first and second signal conductors through the ground clip.

7. The cable assembly of claim 5, wherein the conductor support is manufactured from a low loss material to control insertion loss.

8. The cable assembly of claim 5, wherein the conductor support is molded in place over the exposed portions of the first and second signal conductors.

9. The cable assembly of claim 5, wherein the conductor support is molded to the ground clip.

10. The cable assembly of claim 5, wherein the conductor channels of the conductor support include openings to load the first and second signal conductors into the conductor channels.

11. The cable assembly of claim 1, wherein the ground clip includes a support wall supporting the end of the cable, the support wall including a window, the exposed portions of the first and second signal conductors extending through the window, the ground clip including an upper connecting tine extending from the support wall to interface with an upper portion of the cable shield and electrically connect the ground clip to the cable shield at a first point of contact, the ground clip including a lower connecting tine extending from the support wall to interface with a lower portion of the cable shield and electrically connect the ground clip to the cable shield at a second point of contact, the ground clip including a mounting tab extending from the support wall, the mounting tab configured to be mounted to a circuit card to fix the ground clip relative to the circuit card and electrically connect the ground clip to the circuit card.

12. The cable assembly of claim 11, wherein the ground clip includes a mounting tab extending from the support wall, the mounting tab configured to be mounted to the circuit card to position the support wall relative to the circuit card.

13. The cable assembly of claim 11, wherein the support wall forms a pocket that receives and holds the end of the cable.

14. The cable assembly of claim 11, wherein the upper and lower connecting tines are electrically connected to opposite sides of the cable shield.

15. The cable assembly of claim 11, wherein the lower connecting tine is located between the cable and the circuit card, the lower connecting tine extending from the support wall at a transverse angle such that a distal end of the lower connecting tine is elevated a distance from the mounting surface of the circuit card.

16. The cable assembly of claim 11, wherein the cable includes a drain wire, the support wall includes a drain wire slot that receives the drain wire, the drain wire being electrically connected to the ground clip.

17. The cable assembly of claim 11, wherein the support wall includes a lower panel and a support panel extending from the lower panel at a transverse angle, the lower panel configured to be mounted to the mounting surface of the circuit card, the support panel extending away from the mounting surface to support the end of the cable.

18. The cable assembly of claim 17, wherein the lower panel is oriented parallel to the mounting surface of the circuit card and the support panel is oriented at between approximately 30° and 60° relative to the lower panel and the mounting surface.

19. A cable assembly comprising:

a cable having an insulator at a cable core holding a first signal conductor and a second signal conductor, the cable having a cable shield surrounding the insulator, the first and second signal conductors having exposed portions extending forward of an end of the insulator at an end of the cable configured to be soldered to contact pads on a mounting surface of a circuit card;

a conductor support located forward of the end of the insulator to support the exposed portions of the first and second signal conductors, the conductor support being manufactured from a dielectric material, the conductor support including conductor channels receiving the exposed portions of the first and second signal conductors; and a ground clip coupled to the conductor support;

wherein the ground clip supports the conductor support and the cable such that the cable extends from the ground clip in a cable exit direction angled transverse relative to the mounting surface of the circuit card.

20. The cable assembly of claim 19, wherein the ground clip supports the cable at the cable exit direction of between 30° and 60° relative to the mounting surface of the circuit card.

21. The cable assembly of claim 19, wherein the ground clip including a support wall receiving the conductor support, the support wall having a lower panel and a support panel extending from the lower panel at a transverse angle, the lower panel configured to be mounted to the circuit card, the support panel extending from the circuit card at the transverse angle, the support panel supporting the conductor support and the end of the cable relative to the circuit card, the support panel including a window, the exposed portions of the first and second signal conductors extending through the window, the ground clip including a mounting tab extending from the lower panel to secure the lower panel to the circuit card and electrically connect the ground clip to the circuit card, the ground clip including a connecting tine extending from the support wall to interface with the cable shield and electrically connect the ground clip to the cable shield.

22. The cable assembly of claim 21, wherein the support wall includes an upper panel extending from the support panel, the lower panel being oriented approximately 45° relative to the support panel, the upper panel oriented approximately 45° relative to the support panel, the connecting tine being a lower connecting tine extending from the lower panel at approximately 45° relative to the lower panel, the ground clip including an upper connecting tine extending from the upper panel at approximately 45° relative to the upper panel, the upper connecting tine being oriented generally parallel to the lower connecting tine, the cable being received between the upper connecting tine and the lower connecting tine.

23. The cable assembly of claim 21, wherein the cable includes drain wires along opposite sides of the cable, the support panel including drain wire slots on both sides of the window, the drain wire slots receiving the corresponding drain wires, the drain wires being electrically connected to the ground clip.

24. A cable connector module comprising:

a housing having a cavity;

a circuit card received in the cavity, the circuit card having a mounting surface, the circuit card including signal contact pads on the mounting surface, the signal contact pads being arranged in pairs, the circuit card including a plurality of rows of the signal contact pads; and cable assemblies terminated to the mounting surface of the circuit card, each cable assembly including a cable and a ground clip coupled to an end of the cable, the ground clip coupling the cable to the mounting surface of the circuit card, the cable having an insulator at a cable core holding a first signal conductor and a second signal conductor, the cable having a cable shield surrounding the insulator, the first and second signal conductors having exposed portions extending forward of an end of the insulator at an end of the cable soldered to corresponding signal contact pads, the ground clip including a support wall supporting the end of the cable, the exposed portions of the first and second signal conductors extending through the support wall for termination to the corresponding signal contact pads, the ground clip being electrically connected to the cable shield, the ground clip mounted to the circuit card to fix the ground clip relative to the circuit card and electrically connect the ground clip to the circuit card, wherein the ground clip supports the cable such that the cable extends from the support wall in a cable exit direction angled transverse relative to the mounting surface of the circuit card.

25. The cable connector module of claim 24, wherein the ground clip supports the cable at the cable exit direction of between 30° and 60° relative to the mounting surface of the circuit card.

26. The cable connector module of claim 24, wherein the support wall includes a window, the exposed portions of the first and second signal conductors extending through the window, the ground clip including an upper connecting tine extending from the support wall to interface with an upper portion of the cable shield and electrically connect the ground clip to the cable shield at a first point of contact, the ground clip including a lower connecting tine extending from the support wall to interface with a lower portion of the cable shield and electrically connect the ground clip to the cable shield at a second point of contact, the ground clip including a mounting tab extending from the support wall, the mounting tab mounted to the circuit card to fix the ground clip relative to the circuit card and electrically connect the ground clip to the circuit card.

27. A cable assembly comprising:

a cable having an insulator at a cable core holding a first signal conductor and a second signal conductor, the cable having a cable shield surrounding the insulator, the first and second signal conductors having exposed portions extending forward of an end of the insulator at an end of the cable;

a ground clip coupled to the end of the cable, the ground clip including a support wall supporting the end of the cable, the support wall including a window, the exposed portions of the first and second signal conductors extending through the window, the ground clip including an upper connecting tine extending from the support wall to interface with an upper portion of the cable shield and electrically connect the ground clip to the cable shield at a first point of contact, the ground clip including a lower connecting tine extending from the support wall to interface with a lower portion of the cable shield and electrically connect the ground clip to the cable shield at a second point of contact, the ground clip including a mounting tab extending from the support wall, the mounting tab configured to be mounted to a circuit card to fix the ground clip relative to the circuit card and electrically connect the ground clip to the circuit card; and a conductor support located forward of the end of the insulator to support the exposed portions of the first and second signal conductors, the conductor support being manufactured from a dielectric material, the conductor support including conductor channels receiving the exposed portions of the first and second signal conductors, the conductor support being coupled to the ground clip;

wherein the ground clip and the conductor support supports the cable such that the cable extends in a cable exit direction angled transverse relative to a mounting surface of the circuit card.

28. The cable assembly of claim 27, wherein the ground clip supports the cable at the cable exit direction of between 30° and 60° relative to the mounting surface of the circuit card.

29. The cable assembly of claim 27, wherein a front portion of the conductor support extending into the window of the support wall.

30. The cable assembly of claim 27, wherein the conductor support includes a rear wall facing the end of the insulator, the conductor channels extending between the rear wall and a front portion to control positioning of the first and second signal conductors through the ground clip.

31. The cable assembly of claim 27, wherein the conductor support is molded in place over the exposed portions of the first and second signal conductors.

32. The cable assembly of claim 27, wherein the conductor support is molded to the ground clip.

33. The cable assembly of claim 27, wherein the conductor channels of the conductor support include openings to load the first and second signal conductors into the conductor channels.

* * * * *